R. B. WILLIAMSON.
DYNAMO ELECTRIC MACHINE.
APPLICATION FILED OCT. 29, 1909.
971,868.
Patented Oct. 4, 1910.
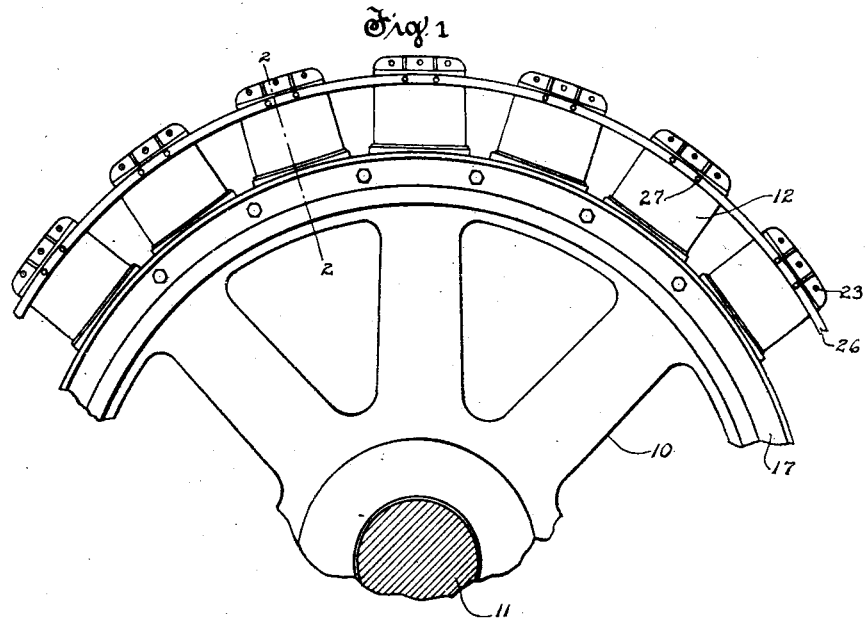
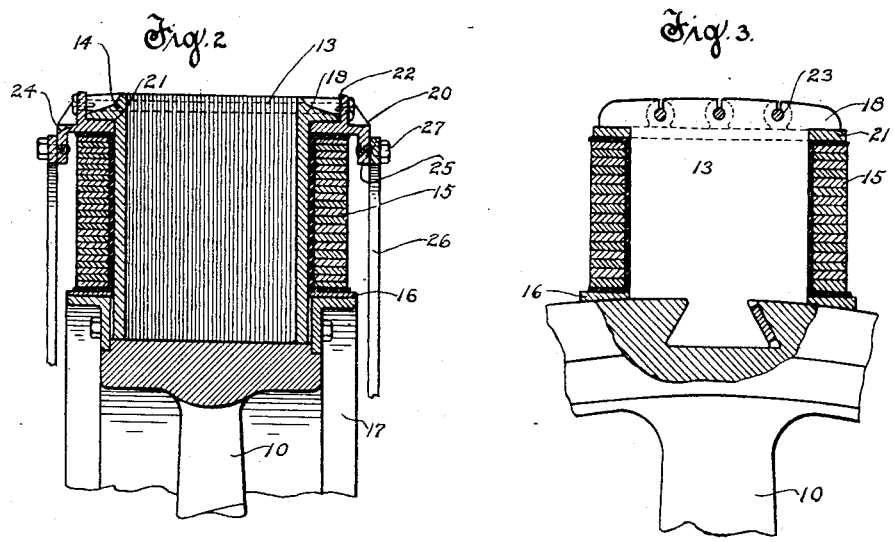
Witnesses
John L. Johnson
Chas. L. Byron
Inventor
Robert B. Williamson
By Chas. E. Lord
Attorney

UNITED STATES PATENT OFFICE.

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

971,868.  Specification of Letters Patent.  Patented Oct. 4, 1910.

Application filed October 29, 1909. Serial No. 525,243.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to improvements in dynamo-electric machines and particularly to dampers or anti-hunting devices for synchronous machines or alternating current generators, and to self-starting devices for synchronous motors.

One of the objects of the invention is the provision of damping and combined damping and self-starting devices which have a very high efficiency, are inexpensive to manufacture and to apply to the machines, and which have a construction and arrangement such that they are securely held against movement or vibration relative to the parts to which they are attached.

A further object is the provision of damping and self-starting devices so constructed that they can be applied to rotating members of dynamo-electric machines employing the standard punchings and end plates between which the punchings are clamped.

My invention may be briefly summarized as consisting in certain novel details of construction and combinations of parts which will be described in the specification and set forth in the appended claims.

For an understanding of my invention reference is had to the accompanying sheet of drawings wherein—

Figure 1 is a side view of part of a rotating field member of a dynamo-electric machine equipped with my improved damping and self-starting devices. Fig. 2 is an enlarged sectional view through a field magnet and a portion of the spider of the machine, the section being taken substantially along the line 2—2 of Fig. 1. Fig. 3 is a section taken through one of the field magnets, the section being at right angles to the section of Fig. 2, a portion of the spider being shown in elevation and a portion adjacent the magnet being broken away.

Although certain features of my invention may be applied to either stationary or rotatable members, I have shown my invention as applied to a rotary field member having a field frame or spider 10 mounted upon a shaft 11 and provided with a plurality of field magnets 12 which are secured to the rim of the spider by dovetail connections. The pole 13 of each field magnet is built up of laminæ which are clamped between end plates 14, and surrounding each pole is a field coil 15 formed, in this case, of edgewise wound strap copper. The inner ends of the coils rest on coil seats 16 which bear against the periphery of the rim of the spider and on rings 17 which are L-shaped in cross section and are bolted to the sides of the rim so as to support the overhanging portions of the coils and to prevent displacement of the field magnets. Each pole is provided with pole tips 18 and the end plates of each pole have the usual laterally projecting flanges 19 which together with the pole tips retain the coil on the pole.

Surrounding the end of each pole is a collar 20 which is formed of good conducting material and constitutes part of the damping and self-starting devices. This collar is provided with a main flat portion 21 which surrounds the pole and is located between the field coil 15 and the pole tips 18 on the punchings and the flanges 19 of the end plates so as to be securely held in position. The collar is provided along opposite sides of the field magnet and just beyond the flanges 19 of the end plates with a pair of flanges 22 which extend radially outward substantially to the outer end of the pole at right-angles to the portion 21.

Extending through the outer end of the pole close to the pole face and at right-angles to the planes of the laminæ and to the plane of rotation of the rotary member, are a number of bars 23 which are formed of good conducting material and have their outer ends secured to these outwardly projecting flanges 22 of the collar, the bars in this case extending through openings in the flanges 22 and being secured thereto by riveting or upsetting the ends of the bars as shown most clearly in Fig. 2. As shown most clearly in Fig. 3 the bars pass through partially closed slots in the laminæ so that as here shown the bars are not entirely surrounded by the laminæ. However, it is immaterial to the present invention whether the slots which receive the bars are closed or only partially closed. When the machine is in operation the collars and bars which extend through the poles and are secured to the collars form seats for induced currents and prevent, in a great measure, irregularities in speed above or below synchronism in a well known manner. The dampers, as above described, may be employed for the purpose of making a synchronous motor self-starting. However, when such a structure is applied to a synchronous motor, I prefer to employ in combination therewith, features which render the self-starting action more effective. By referring particularly to Fig. 2 it will be seen that the collar 20 which surrounds each pole is provided on opposite sides of the field magnet with portions 24 extending outward or laterally beyond the coil surrounding the pole, and at the outer extremities of these portions 24 are flanges 25 which extend radially inward for a short distance along opposite sides of the coil, the portions 21, 22, 24 and 25 all being cast in one integral piece. These flanges 25 are, as shown clearly in Figs. 1 and 2, connected together by short-circuiting rings 26 of conducting material, the rings being in this case secured to the flanges by bolts 27. These rings 26 together with the structure previously described constitute a closed secondary in which the currents may be induced as in the secondary of an induction motor.

It will be seen that the particular construction of the damper and self-starting structure is such that standard punchings and end plates can be employed, thus doing away with the necessity for special dies, patterns, etc., and permitting the use of a field magnet construction which is absolutely safe and reliable at any speed under which the machine may be operated, the only change required in the punchings and end plates being the addition of the openings for the bars 23 and these openings can be very easily provided. Not only does this particular construction permit the use of the standard parts of the pole, but the device can be very easily applied to a machine and securely held in position due to the location of the collars between the coils and the pole tips and flanges of the pole.

I do not desire to be confined to the exact details shown but aim in my claims to cover all modifications which do not involve a departure from the spirit and scope of my invention.

What I claim as new and desire to secure by Letters Patent is:

1. In a dynamo-electric machine, a field pole consisting of laminæ and flanged end plates between which the laminæ are clamped, a coil mounted on the pole, a damping device for the pole comprising a collar having a portion surrounding the pole and located between the coil and the flanges of the end plates, a pair of flanges extending radially outward from the collar along the flanges of the end plates, and a plurality of bars extending through the pole and secured to said flanges of the collar.

2. In a dynamo-electric machine, a field magnet comprising a pole formed of laminæ and end plates between which the laminæ are clamped, said laminæ and plates having coil-retaining portions extending outwardly from the four sides of the pole, a coil mounted on the pole, a damping device for the magnet comprising a collar having a portion surrounding the pole and located between the coil and the coil-retaining portions of the pole, a pair of flanges extending radially outward from said portion of the collar and located beyond the coil-retaining portions of the end plates, and damping bars extending through the pole and secured to said outwardly extending flanges.

3. In a dynamo-electric machine, a plurality of field magnets, each comprising a pole having coil-retaining portions at its outer end, and a coil surrounding the pole, a collar at the outer end of each field magnet and comprising a portion located between the coil and the coil-retaining portions of the pole, each collar having flanges extending radially inward along opposite sides of the field magnet, and short-circuiting rings secured to said flanges.

4. In a dynamo-electric machine, a frame or spider, a plurality of field magnets secured thereto, each field magnet comprising a pole having coil-retaining portions at its outer end, and a coil mounted on the pole, collars surrounding the outer ends of the poles and each having flanges extending radially outward and flanges extending radially inward along opposite sides of the corresponding magnet, damping bars extending through the poles and secured to the outwardly extending flanges, and a pair of short-circuiting rings secured to the inwardly extending flanges.

5. A rotary field member for a dynamo-electric machine comprising a frame or spider, field magnets secured to said spider and each having a pole formed of punchings and end plates, the latter having laterally projecting coil-retaining portions, a coil mounted on each pole, a collar surrounding the outer end of each pole and having flanges extending radially outward along the coil-retaining portions of the end plates and flanges extending radially inward along opposite sides of the coil, damping bars extending through each pole and secured to the outwardly extending flanges of the corresponding collar, and a pair of short-circuiting rings secured to the inwardly extending flanges of the collars.

In testimony whereof I affix my signature, in the presence of two witnesses.

Milwaukee, Wis., Oct. 13, 1909.

ROBERT B. WILLIAMSON.

Witnesses:
　Chas. L. Byron,
　Rob. E. Stall.